United States Patent [19]
Hofer

[11] 3,955,741
[45] May 11, 1976

[54] EXPLOSIVELY OPERATED WELDING CARTRIDGE

[75] Inventor: Peter Hofer, Hofen, Switzerland

[73] Assignee: Georg Fischer Aktiengesellschaft, Schaffhausen, Switzerland

[22] Filed: Feb. 4, 1975

[21] Appl. No.: 546,888

Related U.S. Application Data

[63] Continuation-in-part of Ser. No. 331,883, Feb. 12, 1973, Pat. No. 3,875,326.

[30] Foreign Application Priority Data
Feb. 29, 1972   Switzerland.......................... 2920/72

[52] U.S. Cl................................. 228/2.5; 228/107
[51] Int. Cl.²......................................... B23K 21/00
[58] Field of Search................ 29/421 E; 228/3, 2.5, 228/107, 108, 109

[56] References Cited
UNITED STATES PATENTS
3,184,535   5/1965   Worthington......................... 174/90
3,364,304   1/1968   Modrey............................. 174/94 R Primary Examiner—Al Lawrence Smith
Assistant Examiner—Margaret Joyce
Attorney, Agent, or Firm—Finnegan, Henderson, Farabow & Garrett

[57] ABSTRACT

An explosively operated welding cartridge is provided in which an annularly shaped explosive charge around a sleeve for receiving rod-like metal members is detonated by an ignition strip surrounding the periphery of the annular explosive. The arrangement of the explosive and ignition strip allows the detonation to start at a predetermined peripheral line and to proceed axially along the explosive on an even front to achieve a reliable weld of the sleeve to the metal members.

11 Claims, 8 Drawing Figures

EXPLOSIVELY OPERATED WELDING CARTRIDGE

This application is a continuation-in-part of copending U.S. application Ser. No. 331,883, filed Feb. 12, 1973, now U.S. Pat. No. 3,875,326.

The present invention relates to a cartridge for connection-by-explosion of rod-like metal members with a metal sleeve and, more particularly, to an explosively operated welding cartridge for connecting rod-like metal members, e. g., electrical conductors, by a metal sleeve, consisting of a housing of annular shape surrounding the sleeve and seating in its central channel the metal parts to be connected and in its annular space the explosive to be ignited and an ignition strip surrounding the explosive.

Ordinarily hydraulic presses or so-called coneconnectors are used for connecting the wires of crosscountry lines and the like. In addition, the so-called "Alutherm" process has become known. These processes either are expensive and fail to provide optimum electrical connections, or they can hardly be performed without special tools. Also, welding by explosion for plates and connecting parts by explosive compression are known in the prior art.

An arrangement for connecting conductor ends or other metallic rod-like parts by means of a metallic sleeve and by detonating an explosive layer surrounding said sleeve is known (Swiss Pat. No. 469,377), wherein however the sleeve will be shaped in irregular and uncontrolled manner against the conductor ends pushed into this sleeve with much play and wherein the deformed sleeve will be pressed against the surface of the conductor ends. Even though in this instance a "cold weld" may occur at a few locations, the result from this known connection is quite unreliable because of the uncontrolled shaping of the sleeve, and especially the extent of the cold-weld is uncertain, so that there is a question regarding mechanical tensional strength and in the long run also regarding the quality of the electrical connections.

The present invention addresses the task of creating a cartridge for welding-by-explosion of the initially mentioned kind, which shall be capable of providing a flawless welding connection by explosion of predetermined extent and quality. This is achieved by the invention for a cartridge of the initially defined kind by providing a fuse or an ignition strip surrounding the periphery of an annular explosive layer for the purpose of igniting the latter.

It is true that connections-by-detonation for cables, lines and the like are already known (German Offenlegungsschrift 2,059,032), whereby an ignition strip is laid peripherally around the metal members to be connected, but said strip coils in many turns over almost the entire length of the metal sleeve connecting the metallic members, so that at detonation there is immediate shaping of the metal sleeve and hence compressional connection of the metallic members, but there is no welding of same.

On the other hand, as regards the cartridge for welding by explosion of the present invention, the ignition strip or fuse serves to ignite the annular explosive layer, so that the latter's detonation reliably starts from a peripheral line and therefore spreads over an even front in the axial direction of the sleeve. In this manner one obtains a welding-by-explosion connection of high reliability, which exceeds the tensile strength of the connected parts and furthermore is of constant, low (electrical) transfer resistance, so that this kind of connection may be advantageously used for overhead transmission lines.

The welding-by-explosion cartridge of the present invention may serve to connect wires of different metals and also multiwire cables, braids, etc. Cable lugs may be welded to the conductors, and single or multiple wire taps or branchings and the like may be obtained. In addition, one may fasten one end of the conductor by welding-by-explosion and the other in a different way, for instance, by simple compression, however, with the one and same set of explosive. Since the single sleeve may be used to connect two conductors of different metals one may easily obtain, for example, aluminum-copper connections.

Further, the welding-by-explosion cartridge may be embedded into a sound-absorbing material, for instance, foam rubber or combined with a sand bed. Preferably, the housing parts of the cartridge will be made from a synthetic such as polystyrene or the like.

In lieu of a simple cylindrical a conical housing for the explosive for the purpose of connecting two or three conductors, one may also make use of housings in the shape of a T or a double T or otherwise with a corresponding design for the connection of several conductors.

The welding-by-explosion cartridge of the invention is explained below with reference to the accompanying drawings, in which.

Figure 1:
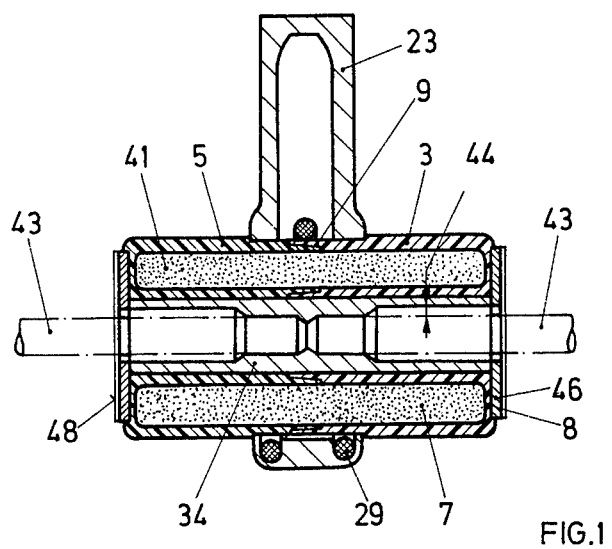
FIG. 1 is an axial section through a welding-by-explosion cartridge for the connection of two wires.
Figure 6:
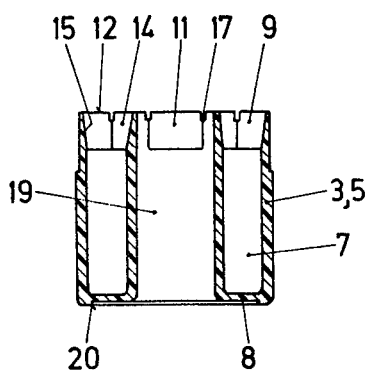
FIG. 6 shows an axial section through one half of the explosive case.
Figure 7:
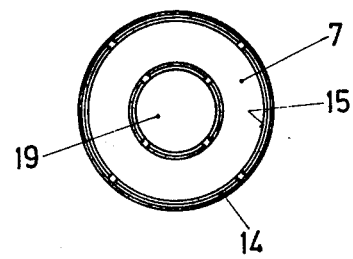
FIG. 7 shows a top view of part of the explosive case according to FIG. 6.

FIG. 1 shows the construction of an explosive welding cartridge 1. The cartridge 1 includes a housing which comprises two exactly identical explosive case halves 3 and 5, shown in FIGS. 6 and 7. The case halves 3 and 5 present an annular space 7 serving to receive explosive and are each provided outwards with an endpiece 8 and, opposite thereto, an edge and connecting element 9. The element 9 is divided into four sectors 11. The termination of the element 9 is formed by four ring surface sectors 12. The element 9 presents outer cone surfaces 14 alternating with inner cone surfaces 15, separated by slots 17.

The case halves 3 and 5 of the explosive housing also present a centrically arranged core channel 19. The endpiece 8 presents a shoulder 20. The case halves 3 and 5, designed to be fitted together and cemented, are provided at their free ends, in the zone of the element 9, with shoulders designed for the axial positioning of ignition case parts 23 and 24.

Figure 2:
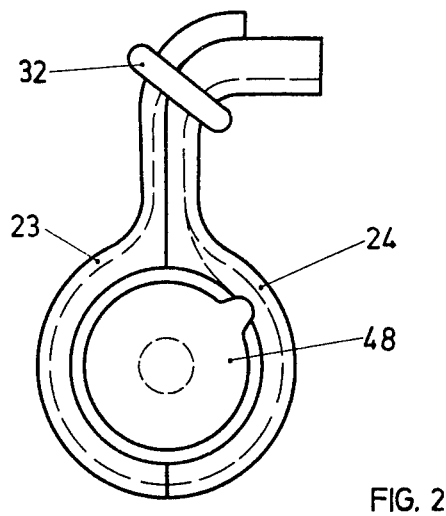
FIG. 2 is a front view of the cartridge of FIG. 1.
Figure 5:
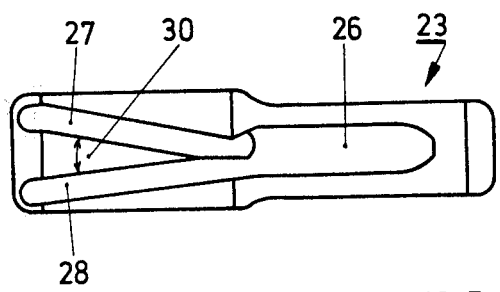
FIG. 5 shows a view of part of an ignition case.
Figure 8:
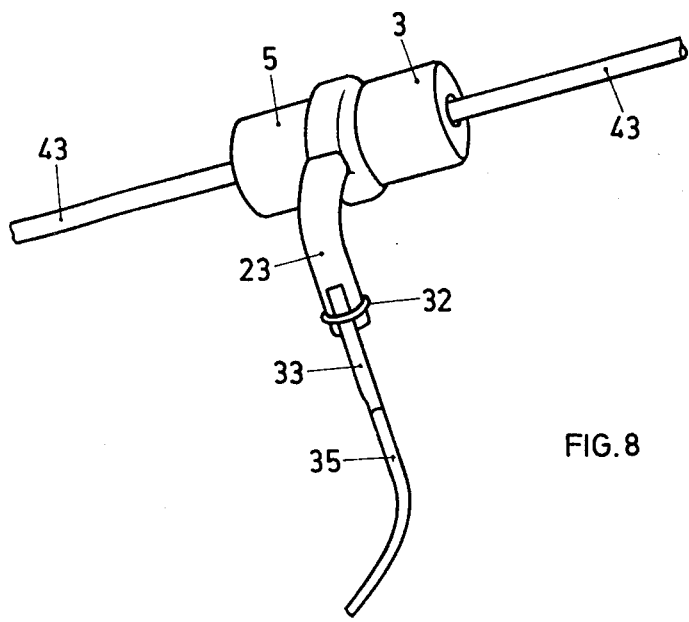
FIG. 8 shows a perspective view of a cartridge, with the wire ends introduced, immediately before blasting.

The construction of the ignition case may be seen from FIGS. 2 and 5 in particular. The ignition case parts 23 and 24 are provided with a main groove 26 and with subsidiary grooves 27 and 28 serving to receive a single-piece detonating cord 29 or a detonating strip. As shown in FIG. 5, the two subsidiary grooves 27 and 28 diverge with respect to the central plane. They form a divergence angle 30, which is between 0° and about 80°, according to sleeve diameter and type of explosive. This divergence angle 30 ensures a uniform connection between the parts to be welded, as the propagation front of the detonation proceeds in a manner uniform and perpendicular to the sleeve axis. In two-piece connections, the cord 29 is only laid round once. Instead, it may also be arranged inside the explosive 41.

As shown in FIG. 2, the free end of the two ignition case parts 23 and 24 presents an O-ring 32 serving to press an ignition cap 33 with a fuse cord 35 against the ends of the detonating cord 29. This, however, is only done at erection on the site.

The ends of the ignition case parts 23 and 24 are bent in a direction perpendicular to the sleeve axis in order to prevent any splinters of the cap 33 from damaging the conductors. The bend in the example shown is such that the explosive case axis and the ignition cap axis are askew with respect to each other.

Figure 3:
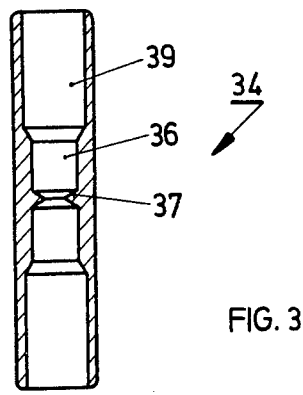
FIG. 3 is an axial section through a joining sleeve of the cartridge according to FIGS. 1 and 2.

FIG. 3 shows a connecting sleeve 34 associated with the explosive welding cartridge 1. A preferred embodiment of the sleeve is provided towards the middle with two guide bores 36 separated from each other by a stop 37. Adjoining each guide bore 36 outwards is a welding bore 39.

The annular space 7 of the housing (FIG. 1) contains explosive 41. FIG. 1 further shows the welding end of a wire 43 whose outer surface is separated from the inner surface of the welding bore 39 by an annular space 44.

The explosive welding cartridge is assembled as follows:

A quantity of explosive is gouged out of a cake by means of the case halves 3 and 5 pressed into the cake. Then the explosive present in the core channel 19 is pressed out. Next, the outer and inner cone surfaces 14 and 15 respectively are coated with an adhesive, and the two case halves 3 and 5, which are identical in construction, are turned so that the cone surfaces 14 and 15 come to lie conversely on the other surfaces 15 and 14. Then the detonation cord 29 is wound twice round the case 3/5 in the zone of the middle thereof, after which the two ignition case parts 23 and 24 are slipped on to the case 3/5. The detonating cord 29 is suitably laid into the grooves 26, 27 and 28, and the whole unit is glued together. Next, the connecting sleeve 34, such as a copper sleeve, is inserted into the core channel 19 and glued in position.

Figure 4:
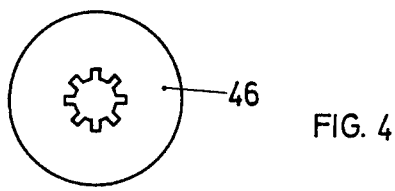
FIG. 4 shows retaining disks which are to be arranged on the end surfaces of the cartridge and which serve to hold the wires before blasting.

Then a retaining disk 46 is glued into the shoulder 20 of the endpiece 8 at each end of the cartridge 1. The disk 46 presents inward-pointing teeth (FIG. 4). These teeth define an inner diameter which is slightly smaller than that of the conductor wire 43 to be welded, in such a manner that the wire, when inserted into the teeth, is secured against falling out before blasting. The disks 46 serving to hold the conductors 43 before blasting are made of an elastic plastic, such as Nylon, Delrin or the like. Instead, they may be punched from metal. Also, they may be formed integral with the case. Then the aperture of each disk 46 is covered by a tab 48 which seals off the interior of the cartridge 1 and thus prevents corrosion of the internal parts, notably of the connecting sleeve bores. Finally, the O-ring 32 is slipped over the ignition case 23/24. The explosive welding cartridge is now ready for use.

The explosive welding cartridge is applied as follows:
First the ends of the rod-like metal members or wires are cleaned. Then the tabs 48 at the two ends of the case 3/5 are removed, and the cleaned ends are inserted into the sleeve 34 in such a manner that they are centered in the guide bores 36 and are held at the stops 37 in axially correct position. The two ends are thus held both in the sleeve 34 and in the retaining disks 46. After insertion of the detonating cap 33 and securing thereof by the O-ring 32, the end of the fuse cord 35 is lit with a match or a flame Detonation of the explosive 41 results in a bond between the ends of the metal members or wires and the sleeve 34, except that the outer edge portions of the sleeve 34 are not welded to the metal members or wires 43, — an advantage particularly in terms of strength, as no notch affects arise. It has thus been found advantageous to arrange the explosive along the sleeve outwards in such a manner that the end of the sleeve does not undergo welding along at least 1% of the sleeve length. The outer parts of the cartridge are either blasted off or evaporated by the explosion.

The arrangement of the ignition cord at a predetermined peripheral location about the cartridge housing allows the detonation of the explosive layer to proceed in a controlled manner. The detonation proceeds from the peripheral line of the ignition cord axially through the explosive layer on an even front. As a result, a welded connection uniform in shape and high in tensile strength is achieved.

The explosive welding cartridge can be used to bond metal members and wires of the most varied materials, in particular metals, and multi-wire conductors, strands, etc.

It is also possible to weld cable shoes to conductors and to produce simple or multiple branches of wires or the like.

It is also possible to join one end of a conductor by explosion welding (as described) and to join the other end not by explosion welding, but by simple compression, though with the same explosive charge.

Moreover, two conductors of different materials can be joined by the same sleeve. This permits aluminum-copper connections to be easily made.

Again, the explosive welding cartridge may be embedded in a sound-proofing mass, such as foam plastic alone or combined with a sand bed. The case parts of the cartridge are preferably made of plastic, such as polystyrene or the like.

Instead of using simple cylindrical or conical explosive cases for the bonding of two or three conductors, it is possible to use T-shaped, double-T-shaped or otherwise shaped cases of suitable design for the bonding of several conductors.

What is claimed is:

1. A cartridge for connection-by-explosion of rod-like metal members comprising a metal sleeve and a housing of annular shape surrounding said sleeve and provided with a central channel for receiving the metal members to be connected and an annular space for receiving an explosive to be ignited, said housing consisting of two parts adhesively joined together, and an ignition strip surrounding the annular explosive layer for detonating said layer.

2. A cartridge for connection-by-explosion of rod-like metal members comprising a metal sleeve and a housing of annular shape surrounding said sleeve and provided with a central channel for receiving the metal members to be connected and an annular space for receiving an explosive to be ignited, an ignition strip surrounding the annular explosive layer for detonating said layer, and an ignition case mounted on said housing and provided with at least one groove for receiving said ignition strip, said groove making an angle less than or equal to 90° with the axis of symmetry of rotation of said housing.

3. A cartridge for connection-by-explosion of rod-like metal members comprising a metal sleeve and a housing of annular shape surrounding said sleeve and provided with a central channel for receiving the metal members to be connected and an annular space for receiving an explosive to be ignited, and an ignition strip surrounding the annular explosive layer in said housing for detonating said layer, said ignition strip being provided with an explosive of higher brisance than the explosive in said housing.

4. A cartridge as defined in claim 2, said ignition case is provided with a seating orifice for receiving an ignition cap at an end of said case away from said housing and a retaining device for holding said cap.

5. A cartridge as defined in claim 1, wherein said metal sleeve is provided with recesses at its opposite ends, each recess comprising a first, inwardly extending borehole of a larger diameter than the metal member to be inserted therein, a second borehole of smaller dimension than the first borehole extending further inward from said first borehole, and a stop at the end of said second borehole for engaging the end of the metal member.

6. A cartridge as defined in claim 5, wherein said metal sleeve is designed in mirror symmetry between its boreholes and stop.

7. A cartridge as defined by claim 2, wherein said ignition case is provided with two grooves slanting toward one another for the purpose of seating said ignition strip.

8. A cartridge as defined in claim 3, wherein the explosive in said housing decreases in its explosive effectiveness toward the outer ends of said sleeve.

9. A cartridge as defined in claim 1, wherein said housing is provided with a central orifice for receiving said sleeve and the metal members to be welded.

10. A cartridge as defined by claim 2, wherein said ignition strip is wound around the explosive in the area of the ends of the metal members.

11. A cartridge as defined by claim 4, wherein said ignition case is bent at its far end so that the orifice for the ignition cap assumes a skew or parallel position to the axis of rotation of the explosive housing.

* * * * *